US012620222B2

(12) United States Patent
Bageshwar et al.

(10) Patent No.: US 12,620,222 B2
(45) Date of Patent: May 5, 2026

(54) SYSTEMS AND METHODS FOR EXTRACTING SURFACE MARKERS FOR AIRCRAFT NAVIGATION

(71) Applicant: Honeywell International Inc., Charlotte, NC (US)

(72) Inventors: Vibhor L. Bageshwar, Rosemount, MN (US); Ashwin Ganapathy, Bangalore (IN); Vijay Venkataraman, Excelsior, MN (US); Romi Srivastava, Lucknow (IN)

(73) Assignee: Honeywell International Inc., Charlotte, NC (US)

( * ) Notice: Subject to any disclaimer, the term of this patent is extended or adjusted under 35 U.S.C. 154(b) by 377 days.

(21) Appl. No.: 18/505,999

(22) Filed: Nov. 9, 2023

(65) Prior Publication Data

US 2025/0104419 A1     Mar. 27, 2025

(30) Foreign Application Priority Data

Sep. 26, 2023     (IN) ............................ 202311064467

(51) Int. Cl.
G06V 20/17          (2022.01)
B64D 45/08          (2006.01)
(Continued)
(52) U.S. Cl.
CPC ............. G06V 20/17 (2022.01); B64D 45/08 (2013.01); G06T 7/12 (2017.01); G06T 7/136 (2017.01);
(Continued)
(58) Field of Classification Search
None
See application file for complete search history.

(56) References Cited

U.S. PATENT DOCUMENTS 10,699,413 B1 *    6/2020    Ansari ................... G06V 10/44
2016/0122038 A1    5/2016    Fleischman et al.
(Continued)

FOREIGN PATENT DOCUMENTS

CN          106127201 B     2/2019
CN          109767442 A     5/2019
(Continued)

OTHER PUBLICATIONS

He, Y., Zeng, Z., Li, Z., & Deng, T. (2023). A New Vision-based Method of Autonomous Landing for UAVs. 2023 9th International Conference on Electrical Engineering, Control and Robotics (EECR), 1-6. https://doi.org/10.1109/EECR56827.2023.10149915 (Year: 2023).*
(Continued)

*Primary Examiner* — Amandeep Saini
*Assistant Examiner* — Caroline Tabancay Duffy
(74) *Attorney, Agent, or Firm* — Fogg & Powers LLC

(57) ABSTRACT

A method comprises capturing, with a vehicle vision sensor, a color image of a landing site including landing surface markers; converting the color image to a gray scale image; and performing multi-scale-binarization to detect multiple edges of the gray scale image and produce binary images. The method determines contours of edges of the binary images having closed shapes, detects closed shapes of contours of edges having four corners, and verifies whether four-sided candidate contours are valid as potential landing surface markers. If more than one contour is associated with a valid ID within a surface marker library, then the contour within the smallest window size is selected. If multiple contours with the same window size can be associated with a valid ID, then a mean of corresponding corners of multiple
(Continued)

contours is computed. The method then performs corner refinement of valid four-sided candidate contours identified as potential landing surface markers.

19 Claims, 8 Drawing Sheets

(51) Int. Cl.

| | | |
|---|---|---|
| *G06T 7/12* | (2017.01) | |
| *G06T 7/136* | (2017.01) | |
| *G06V 10/75* | (2022.01) | |

(52) U.S. Cl.
CPC .......... *G06V 10/752* (2022.01); *G06V 10/754* (2022.01); *G06T 2207/10024* (2013.01); *G06T 2207/10032* (2013.01); *G06T 2207/20016* (2013.01); *G06T 2207/20021* (2013.01); *G06T 2207/20092* (2013.01); *G06T 2207/30181* (2013.01); *G06T 2207/30204* (2013.01)

(56) References Cited

U.S. PATENT DOCUMENTS

| | | | | |
|---|---|---|---|---|
| 2019/0156698 A1 * | 5/2019 | Kurowski | ................. | G06F 8/34 |
| 2020/0387553 A1 * | 12/2020 | Tyulyaev | ............. | G06V 10/764 |
| 2022/0351517 A1 * | 11/2022 | Mousavi | ................... | G06T 3/02 |

FOREIGN PATENT DOCUMENTS

| | | |
|---|---|---|
| CN | 110543837 A | 12/2019 |
| CN | 110989674 A | 4/2020 |
| CN | 109823552 B | 2/2021 |
| CN | 108453738 B | 4/2021 |
| CN | 110989687 B | 8/2021 |
| CN | 114012736 A * | 2/2022 ............ B25J 9/1697 |

OTHER PUBLICATIONS

Zea, A., & Hanebeck, U. D. (2019). Refined Pose Estimation for Square Markers Using Shape Fitting. 2019 22th International Conference on Information Fusion (FUSION), 1-8. https://doi.org/10.23919/FUSION43075.2019.9011236 (Year: 2019).*

European Patent Office, "Extended European Search Report", dated Jan. 29, 2025, from U.S. Appl. No. 18/505,999, from Foreign Counterpart to U.S. Appl. No. 18/505,999, pp. 1 through 19, Published: EP.

He et al., "A New Vision-based Method of Autonomous Landing for UAVs", 2023 the 9th International Conference on Electrical Engineering, Control and Robotics (EECR), Feb. 24, 2023, pp. 1 through 6.

Rannestad et al., "Visual close-range Navigation and Docking of Underwater Vehicles", Oceans 2023, Limerick, Jun. 5, 2023, pp. 1 through 10.

Romero-Ramire et al., "Fractal Markers: A new Approach for Long-Range Marker Pose Estimation Under Occlusion", IEEE Access, vol. 7, Dec. 2, 2019, pp. 169908 through 169919.

Tocci et al. "ArUCo marker-based displacement measurement technique: uncertainty analysis", Engineering Research Express, vol. 3, No. 3, 035032, Sep. 1, 2021, pp. Cover Page through 11.

Xiang et al., A Multi-stage Precision Landing Method for Autonomous eVTOL Based on Multi-marker Joint Localization, 2022 IEEE International Conference on Robotics and Biomimetics (ROBIO), Dec. 5, 2022, pp. 2015 through 2020.

Zea et al., "Refined Pose Estimation for Square Markers Using Shape Fitting", 2019, 22nd International Conference on Information Fusion (FUSIOM), Jul. 2, 2019, pp. 1 through 8.

* cited by examiner

200

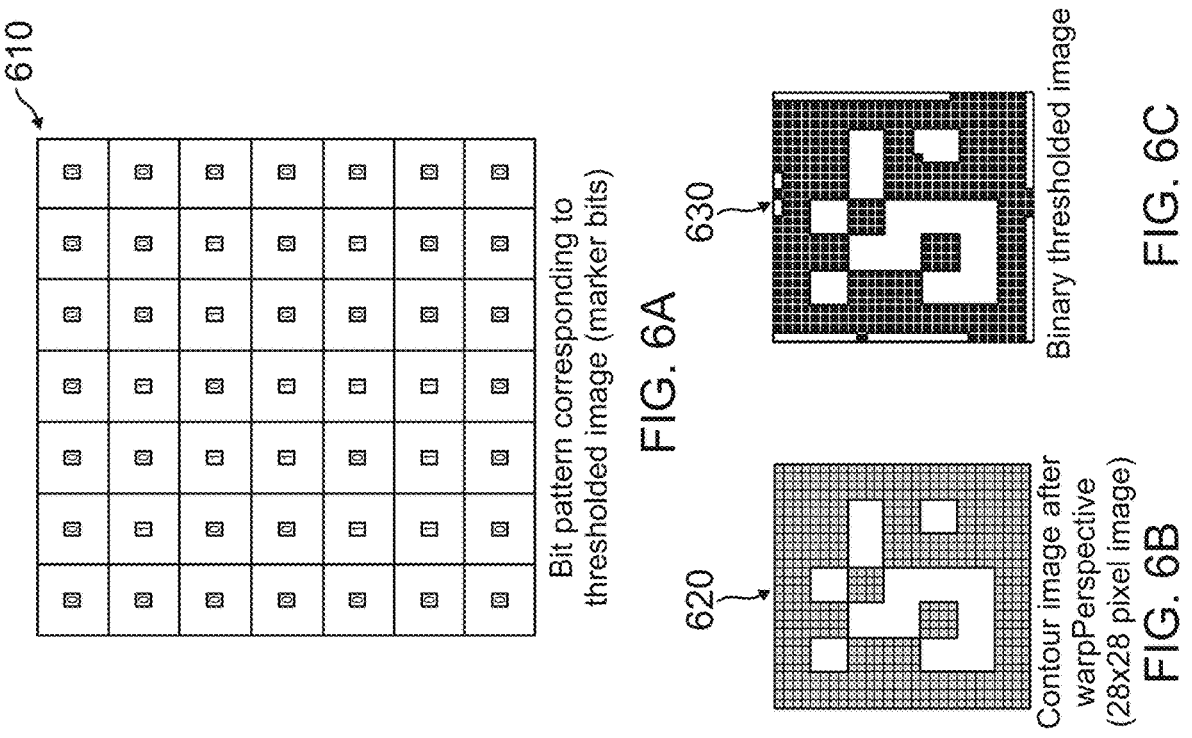
Bit pattern corresponding to thresholded image (marker bits)
FIG. 6A
Contour image after warpPerspective (28x28 pixel image)
FIG. 6B
Binary thresholded image
FIG. 6C
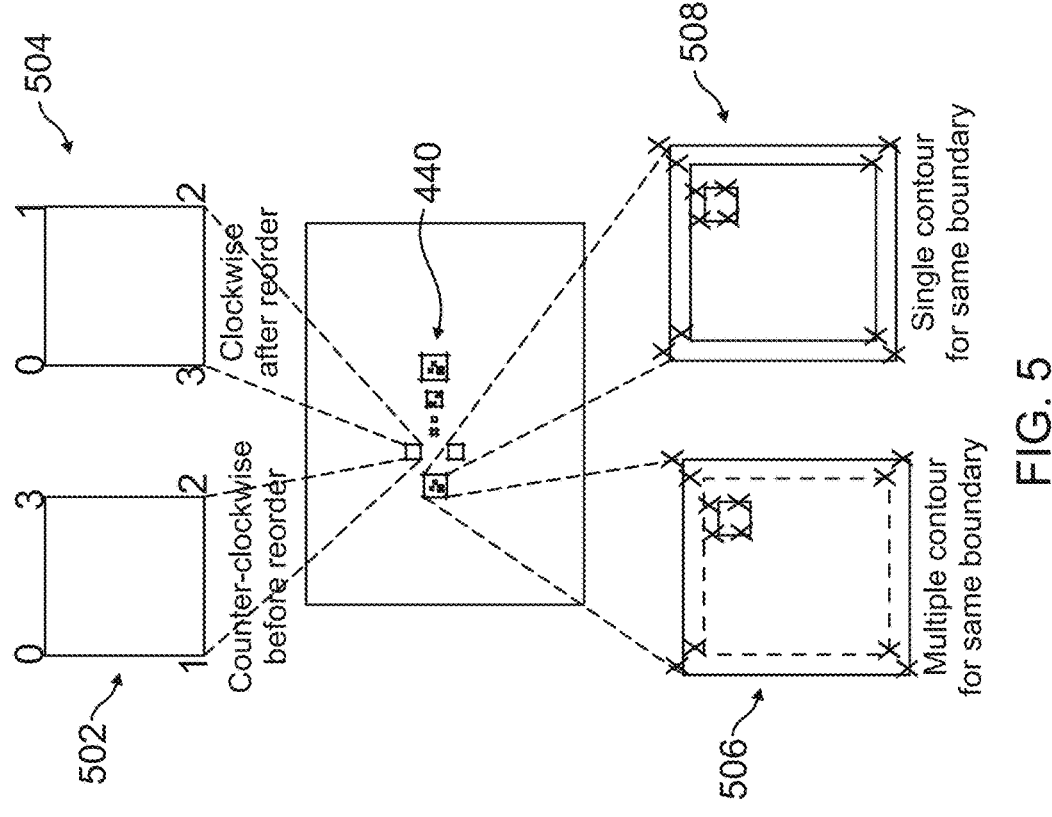
Counter-clockwise before reorder
Clockwise after reorder
Multiple contour for same boundary
Single contour for same boundary
FIG. 5

SYSTEMS AND METHODS FOR EXTRACTING SURFACE MARKERS FOR AIRCRAFT NAVIGATION

CROSS-REFERENCE TO RELATED APPLICATIONS

This application claims the benefit of Indian Provisional Application No. 202311064467, filed on Sep. 26, 2023, same title, the contents of which are incorporated herein in their entirety.

BACKGROUND

Uncrewed aircraft systems (UAS) applications in the national airspace (NAS) include delivery, sampling, surveillance, and passenger transport. The UAS flights can be broken into various segments or phases including take-off, ascent to cruise, cruise, descent to landing, and landing. The cruise segment can include mission segments where the UAS loiters or performs other tasks. The UAS landing sites include allocated landing zones such as vertiports on the ground, on tops of buildings, or on moving vehicles such as trucks or ships.

UAS navigation systems must satisfy stringent requirements to enable autonomous landing at sites such as vertiports to support these applications. These navigation systems must operate in both global navigation satellite system (GNSS) available and GNSS-denied environments. Further, certain UAS operators have requirements that vertiports are unpowered or minimally powered, so ground or surface infrastructure to support navigation systems cannot include powered features or GNSS ground stations. Hereafter, the term "surface" will refer to vertiports located on the ground, or tops of buildings, or on moving vehicles. As a result, UAS navigation systems require sensor alternatives to GNSS, to aid the navigation systems in landing zones that rely on unpowered features.

A camera mounted on a UAS is one such sensor that can be used in combination with Aruco codes on the surface to aid the UAS navigation system during the landing segment. The Aruco codes are unpowered and can be located within the Final Approach and Takeoff (FATO) area of a vertiport. These codes provide onboard cameras with known surface features to compute measurements for the navigation system.

SUMMARY

A method comprises capturing, with a vision sensor on a vehicle, a color image of a landing site that includes one or more landing surface markers; converting the color image to a gray scale image; and performing multi-scale-binarization to detect multiple edges of the gray scale image and produce a plurality of binary images having differing sizes, based on the gray scale image. Multiple windows of different sizes are used to detect edges in the gray scale image, and within a given window, an adaptive threshold is used to slide the window across the gray scale image to produce a complete edge map for the given window. The method further comprises determining contours of edges of the binary images that have closed shapes; and detecting any closed shapes of the contours of edges that have four corners by a process comprising: selecting the contours of edges that exceed a user-selected threshold for perimeter size; retaining the selected contours that have four sides; determining a minimum corner separation of the contours that have four sides;

eliminating any contours that are within a user-selected threshold for distance from an edge of a respective binary image; and retaining any remaining contours as four-sided candidate contours. The method also comprises verifying whether the four-sided candidate contours are valid as potential landing surface markers by a process that comprises warping each four-sided candidate contour into a fixed size square contour that is tested for sufficient variance of an image intensity value by computing a standard deviation of the image intensity value, and if the standard deviation of the image intensity value is above a user-selected threshold, then converting the fixed size square contour into a binary image to determine a candidate bit pattern within the contour. If an encoded bit error corresponding to a border of each candidate bit pattern is below a user-selected threshold, then accepting the candidate bit pattern for further processing. The method determines if bits of the candidate bit pattern, other than its border bits, match any standard bit patterns within a surface marker library for a given landing site at a vertiport, and if there is a match within a user-selected bit error threshold, then the candidate bit pattern is accepted as a valid ID. If more than one contour is associated with a valid ID within the surface marker library, then the method selects the contour within a smallest window size and ignores all other contours. If multiple contours within a same window size can be associated with a valid ID within the surface marker library, then the method computes a mean of corresponding corners of the multiple contours. The method also performs corner refinement of valid four-sided candidate contours identified as potential landing surface markers by a process that comprises using local gradients to move corners of each four-sided candidate contour to a sharpest transition point.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIG. 5 depicts example images and outputs produced by another exemplary process operation in the method for extracting surface markers of FIG. 3A;

FIGS. 6A-6C depict example images and outputs produced by a further exemplary process operation in the method for extracting surface markers of FIGS. 3A and 3B.

DETAILED DESCRIPTION

Figure 1A:
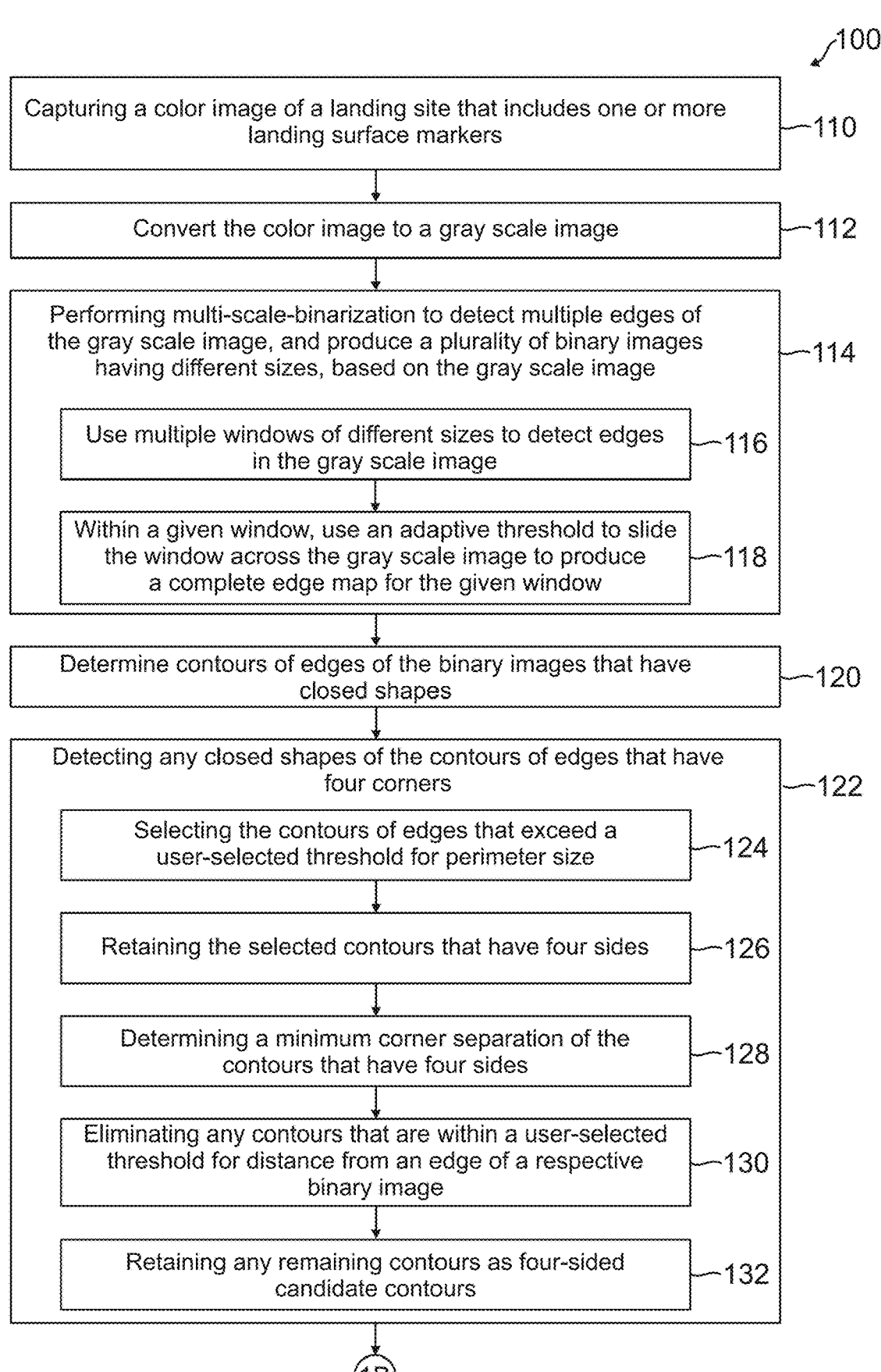
FIGS. 1A and 1B are flow diagrams of a method for extracting surface markers for use in navigation of a vehicle, according to an example implementation.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Systems and methods for extracting surface markers for navigation of aircraft during takeoff and landing, are described herein. The systems and methods can used for various aerial vehicles, such as UAS, uncrewed aerial vehicles (UAVs), Urban Air Mobility (UAM) vehicles, next-generation autonomous vehicles, or the like.

The present approach uses techniques that robustly extract surface markers, such as Aruco codes, from vehicle camera images as an aerial vehicle descends during a landing segment, where the surface markers are extracted without using additional sensors such as an inertial measurement unit (IMU), or other aiding sensors. Further, the present techniques can potentially be used to certify a vision-based sensor for UAS landing at a vertiport, because the integrity of the Aruco codes extracted from the image can be assured.

An Aruco code is a binary square fiducial marker that includes a black border and an inner binary matrix (of whites and black squares or bits) which serves to identify the marker. A single, known marker position can help a navigation system uniquely determine a camera's, and thus the vehicle to which the camera is affixed, position relative to the marker. If the marker's position is known within the final approach and take-off (FATO) area, then the navigation system can subsequently determine the camera's position relative to the FATO area.

There are a number of standard, non-machine learning techniques to extract the corners and edges of an Aruco code from a camera image. These standard techniques include six general steps: step 1: convert camera image to gray scale image; step 2: find shape edges in gray scale image using standard edge detection technique using one or more windows of different sizes; step 3: find contours using edges; step 4: prune contours using multiple threshold tests; step 5: formulate potential Aruco codes from remaining contours; step 6: final refinement of Aruco codes (e.g., 5×5, 6×6, or 7×7 bits) and compare to the Aruco code library for a given vertiport; and step 6a: if a minimum number of bits of an extracted Aruco code match one of the Aruco code bits in the library as defined by a user specified threshold, then the extracted Aruco code is considered matched to an Aruco code in the library of a FATO area. The limitations of this approach are that it depends on the technique used to find shape edges in the gray scale images.

Without relying on a different sensor or measurements from previous time epochs, the present method enhances the robustness of the extraction of the Aruco codes from the images. For example, in step 2 above, instead of using standard techniques to identify shape edges from gray scale image, multiple techniques and scales (window sizes) are used to find shape edges in the image. The entirety of the above step 3 and step 4 are completed using multiple techniques and window sizes. At the end of step 4, the remaining contours from each of the techniques and window sizes are compared to each other. For a contour be considered in the above step 5, two or more contours that pass the threshold tests from the different techniques and window sizes must exist in the same pixel region of the camera image. Using multiple techniques and window sizes to identify contours in a single image at one measurement epoch provides different ways of interpreting information from the same image. By requiring corroboration from multiple techniques or window sizes to identify a contour, or region of interest, robustness is added to extraction of Aruco codes from the image.

In one implementation of the present method, a color input image is converted to a gray scale image. Windowed thresholding is used to find edges by sliding a window of multiple sizes over the gray scale image, and adaptive mean thresholding is performed to produce a binary image. The method then finds contours in the binary image, in which the contours are edges that form closed shapes. The contours are then pruned, as small contours do not contain enough information to determine the identity of the markers, and contours that cannot be bounded as a four-sided polygon are removed. Once a four-sided polygon is found, it needs to be large enough to support identification. For example, the smallest side of the polygon should be greater than a user-selected number of pixels such as 10 pixels, as this eliminates squares that appear squeezed due to perspective viewpoints. In addition, contours close to image edges are eliminated, as the corners of the contour should have sufficient pixel distance from the image edges. For example, a user-selected margin of pixels such as 30 pixels from the image edges can be used. Pixels near the image boundary typically have some residual distortion and using contours with corners in these regions can lead to erroneous results.

Next, during marker identification, each square candidate contour from the previous step is warped into a user-selected pixel grid, such as into a 28×28 grid, and binarized. The marker identification proceeds if the standard deviation of the interior pixels of the contour are greater than a user-selected threshold. Bits are encoded using a majority of user-selected inner pixels such as the inner 4 pixels in each contour. The inner pixels are chosen as image warping and interpolation can make the outer pixels noisy. If the majority of the inner pixels, such as three or more inner pixels, are white in the thresholded image, then it is encoded as a 1, else it is encoded as 0. The method proceeds further if, for example, less than a user selected threshold, such as 33%, of border pixels have no error (are black).

Thereafter, a candidate contour's bit pattern is matched against each known code pattern in the Aruco code library for the vertiport. The closest matching ID from the Aruco code library is found based on the number of bits that match that exceeds a user selected threshold. For example, for a 5×5 bit pattern of a contour to be declared as a valid ID, at least 24 of 25 bits must match for robust marker association. If the bit patterns from multiple contour window sizes are associated with the same ID in the Aruco code library, then only those contours with the smallest window size are retained, resulting in more accurate marker edges especially at higher vehicle altitudes. If the bit pattern from one contour window size is associated with the same ID in the Aruco code library multiple times, then either the contour with the largest perimeter is retained or the average of the associated contours is used. The contours with bit patterns that do not match the code patterns in the Aruco code library for the vertiport are rejected (no spatial relation is used). Additional tests are also placed on the contours. First, contours are retained if they have an average edge pixel length greater than a user-selected threshold, for example, 50 pixels. Second, contours are rejected if they have an average edge length less than a user-selected threshold, for example, 20 pixels. For contours that have average edge lengths between the two user-selected thresholds, for example user-selected thresholds of 20 and 50 pixels, the contours with the largest perimeter or largest size are retained. Contour corner refinement is performed by using local gradients to move corners to the sharpest transition point.

In another implementation, the method determines if a detected ID within a contour is in a list of valid IDs within the Aruco code library for a given landing site at a vertiport. If the detected ID is in the list of valid IDs, then the contour with the detected ID is accepted as valid for further processing. If the detected ID is not in the list of valid IDs, then the contour with the detected ID is ignored and the method proceeds to the next contour with a detected ID. If a valid detected ID has a contour size above a first user-selected threshold, then the contour with the valid detected ID is accepted for further processing. If the valid detected ID has a contour size below a second user-selected threshold, then the contour with the valid detected ID is rejected. For any contour with valid detected IDs with a contour size between the first and second user-selected thresholds, the contour with the valid detected ID with the largest size is accepted and all other valid IDs are rejected.

In addition, a combination of contours with valid detected IDs can be used to determine a correct landing site at a vertiport with multiple landing sites to avoid landing site ambiguity, when one or more nearby landing sites have common markers.

Further details regarding the present method and system are described as follows and with reference to the drawings.

Figure 1B:
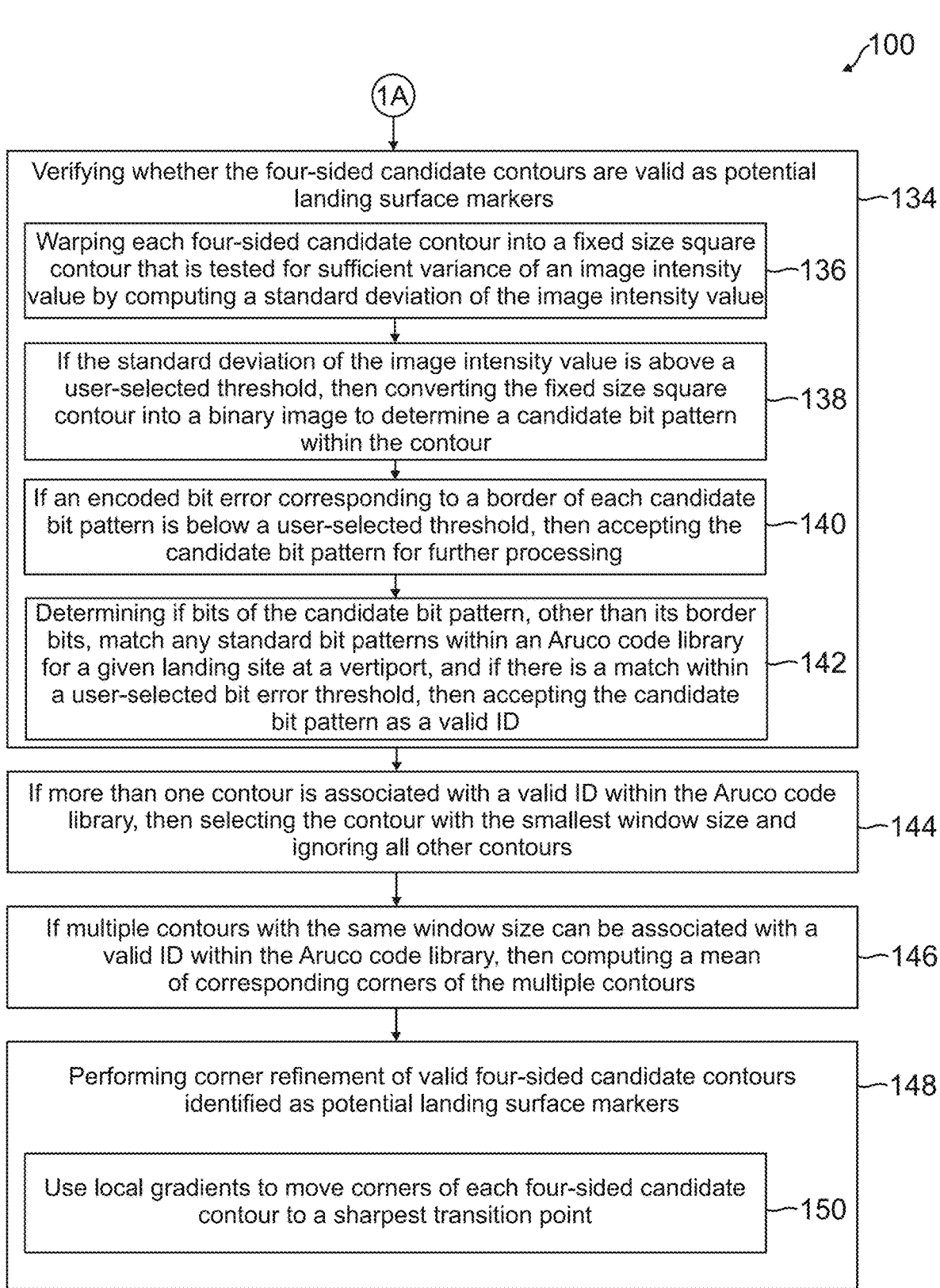

FIGS. 1A and 1B depict flow diagrams of a method 100 for extracting surface markers for aircraft navigation, according to an exemplary implementation. Initially, as shown in FIG. 1A, method 100 captures a color image of a landing site that includes one or more landing surface markers (block 110), such as with a vision sensor on a vehicle. The method 100 converts the color image to a gray scale image (block 112), such as by using standard conversion techniques. The method 100 then performs multi-scale-binarization to detect multiple edges of the gray scale image, and produce a plurality of binary images having differing sizes, based on the gray scale image (block 114). This can be done by using multiple windows of different sizes to detect edges in the gray scale image (block 116); and within a given window, using an adaptive threshold to slide the window across the gray scale image to produce a complete edge map for the given window (block 118).

Next, method 100 determines contours of edges of the binary images that have closed shapes (block 120). The method 100 detects any closed shapes of the contours of edges that have four corners (block 122), by a process comprising: selecting the contours of edges that exceed a user-selected threshold for perimeter size (block 124); retaining the selected contours that have four sides (block 126); determining a minimum corner separation of the contours that have four sides (block 128); eliminating any contours that are within a user-selected threshold for distance from an edge of a respective binary image (block 130); and retaining any remaining contours as four-sided candidate contours (block 132).

As shown in FIG. 1B, method 100 then verifies whether the four-sided candidate contours are valid as potential landing surface markers (block 134), by a process comprising: warping each four-sided candidate contour into a fixed size square contour that is tested for sufficient variance of an image intensity value by computing a standard deviation of the image intensity value (block 136); if the standard deviation of the image intensity value is above a user-selected threshold, then converting the fixed size square contour into a binary image to determine a candidate bit pattern within the contour (block 138); if an encoded bit error corresponding to a border of each candidate bit pattern is below a user-selected threshold, then accepting the candidate bit pattern for further processing (block 140); and determining if bits of the candidate bit pattern, other than its border bits, match any standard bit patterns within an Aruco code library for a given landing site at a vertiport, and if there is a match within a user-selected bit error threshold, then accepting the candidate bit pattern as a valid ID (block 142).

If method 100 determines that more than one contour is associated with a valid ID within the Aruco code library, then method 100 selects the contour with the smallest window size and ignores all other contours (block 144). If method 100 determines that multiple contours with the same window size can be associated with a valid ID within the Aruco code library, then method 100 computes a mean of corresponding corners of the multiple contours (block 146). The method 100 then performs corner refinement of valid four-sided candidate contours identified as potential landing surface markers (block 148). This can be done by a process that uses local gradients to move corners of each four-sided candidate contour to a sharpest transition point (block 150).

Figure 2:
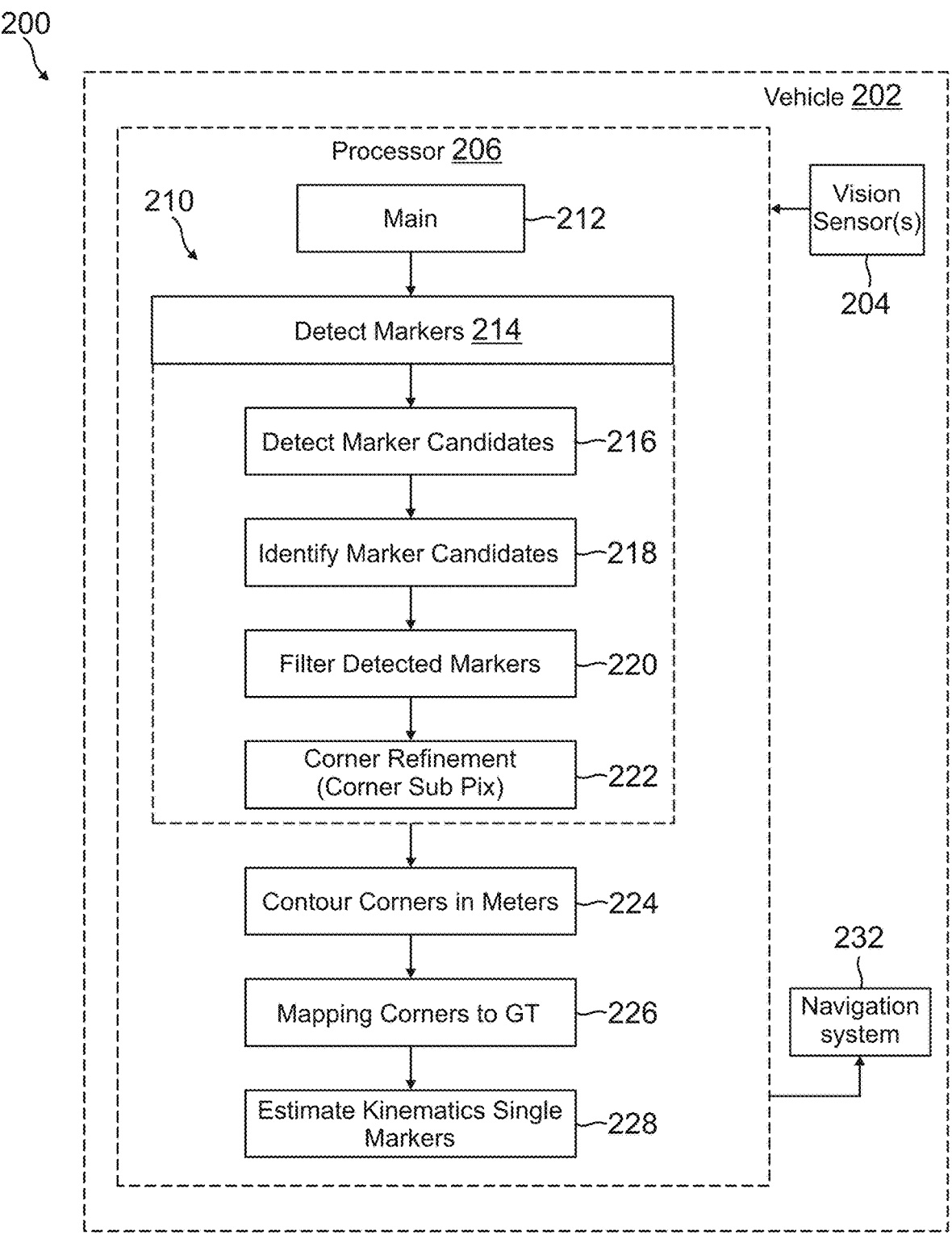
FIG. 2 is a block diagram of a system for extracting surface markers for use in navigation of a vehicle, according to an exemplary embodiment.

FIG. 2 is a block diagram of a system 200 for extracting surface markers for use in navigation of a vehicle 202, according to an exemplary embodiment. The vehicle 202 can be a UAM vehicle, UAS, UAV, or the like. The vehicle 202 has at least one vision sensor 204 mounted thereon, such as one or more cameras, operative to capture color images of a surface area. The vehicle 202 includes at least one processor 206 operatively coupled to vision sensor 204. The processor 206 hosts a set of program modules operative for extracting landing site surface marker information for use in navigation of vehicle 202.

The processor 206 includes program instructions, executable by processor 206, to perform a method 210 for executing high level software function calls, which are described in further detail hereafter, and which implement the present approach for extracting surface markers. Initially, method 210 starts with a main function module 212 that calls a detect markers function module 214, which provides the topmost function call for surface marker detection (e.g., defined in aruco.cpp available from the free on-line repository OpenCV). All of the subsequent functions for marker detection are called from inside the detect markers function module 214. The main function module 212 provides a colored input image to the detect markers function module 214, which converts the input image to a gray scale image.

A detect marker candidates function module 216 is the first function called from the detect markers function module 214, and receives the gray scale image from the detect markers function module 214. The detect marker candidates function module 216 returns contours and corresponding corners that satisfy user-selected criteria on the number of corners and contour length, which are possible candidates for markers. For example, a multi-scale-binarization process can be used to detect multiple potential contour boundaries, or edges, of the gray scale image. This process produces a plurality of different edges within the same gray scale image. This can be done by using multiple windows of different sizes to detect edges in the gray scale image, and within a given window, using an adaptive threshold as the window slides across the gray scale image to produce a complete edge map of the image using the selected window. Thereafter, this process identifies contours of edges of the binary images that have a closed shape, detects the closed shapes of the contours that have four corners, and retains those contours as candidate contours that pass user-selected threshold tests.

An identify marker candidates function module 218 takes the contours and corners detected from the detect marker candidates function module 216, and checks the validity for a possible marker valid ID (e.g., Aruco code marker) within the Aruco code library. The identify marker candidates function module 218 returns those contours and corners that correspond to a valid ID, and also returns the corresponding ID number. As different window sizes can be used to detect the markers, this can result in multiple contours with the same marker ID. Although most nearby contours are filtered out in the detect marker candidates function module 216, some of these contours may still be present and not filtered out. Thus, a filter detected markers function module 220 is used to filter out multiple detections for the same marker, and retain the marker that is detected using the smallest window size for a given ID. In some instances, the corners detected may have some error and not align with the actual marker corners. A corner refinement function module 222 (e.g., CornerSubPix available from the free on-line repository OpenCV), can be used to refine a detected corner and align it with the actual marker corner as closely as possible.

Once markers with valid identifications (IDs) are detected by the above functions, a contour corners in meters function module 224 is used to map the corners detected for each valid ID to a corresponding 3D coordinate in marker coordinates located at the center of the marker such as a North-East-Down (NED) frame. For example, each corner can be associated to a corresponding position from the center of the marker in the NED frame. A mapping corners to ground truth (GT) function module 226 then combines all the valid IDs and corresponding 3D coordinates into two separate vectors, with one vector corresponding to pixels coordinates, and the other vector corresponding to 3D coordinates in a locally defined NED frame. This function is used to pass corners and corresponding GT to a pose estimation algorithm. An estimate kinematics single markers function module 228 takes the pixel coordinate and 3D coordinate vectors from the mapping corners to GT function module 226, to determine the relative camera kinematics to the valid ID. These kinematics include the position and angular orientation of the camera relative to the valid ID. The estimate kinematics single markers function module 228 can use solvePnP (or solvePnPRansac) (available from the free on-line repository OpenCV) depending upon the user-selected method for estimating the relative camera kinematics to the valid ID and, thus, the surface. When the extraction of surface marker information is finished including the estimation of the relative camera kinematics, this information is sent to an onboard vehicle navigation system 232, to aid in providing guidance for use during takeoff or landing of vehicle 202.

Various aspects of the present approach are described in further detail as follows.

Figure 3A:
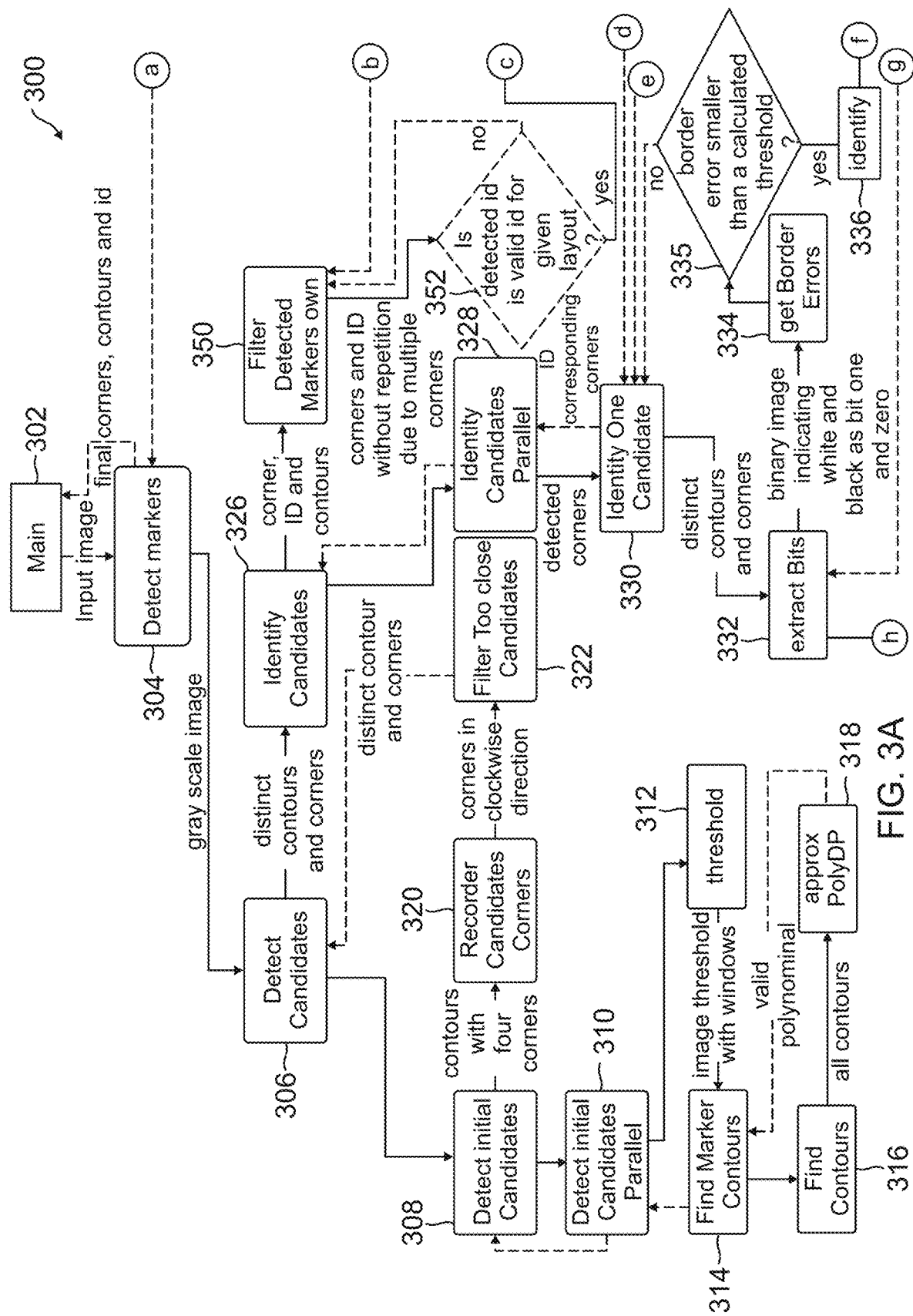
FIGS. 3A and 3B are flow diagrams of a method for extracting surface markers, which shows hierarchical function calls for performing the method, according to an exemplary implementation.
Figure 3B:
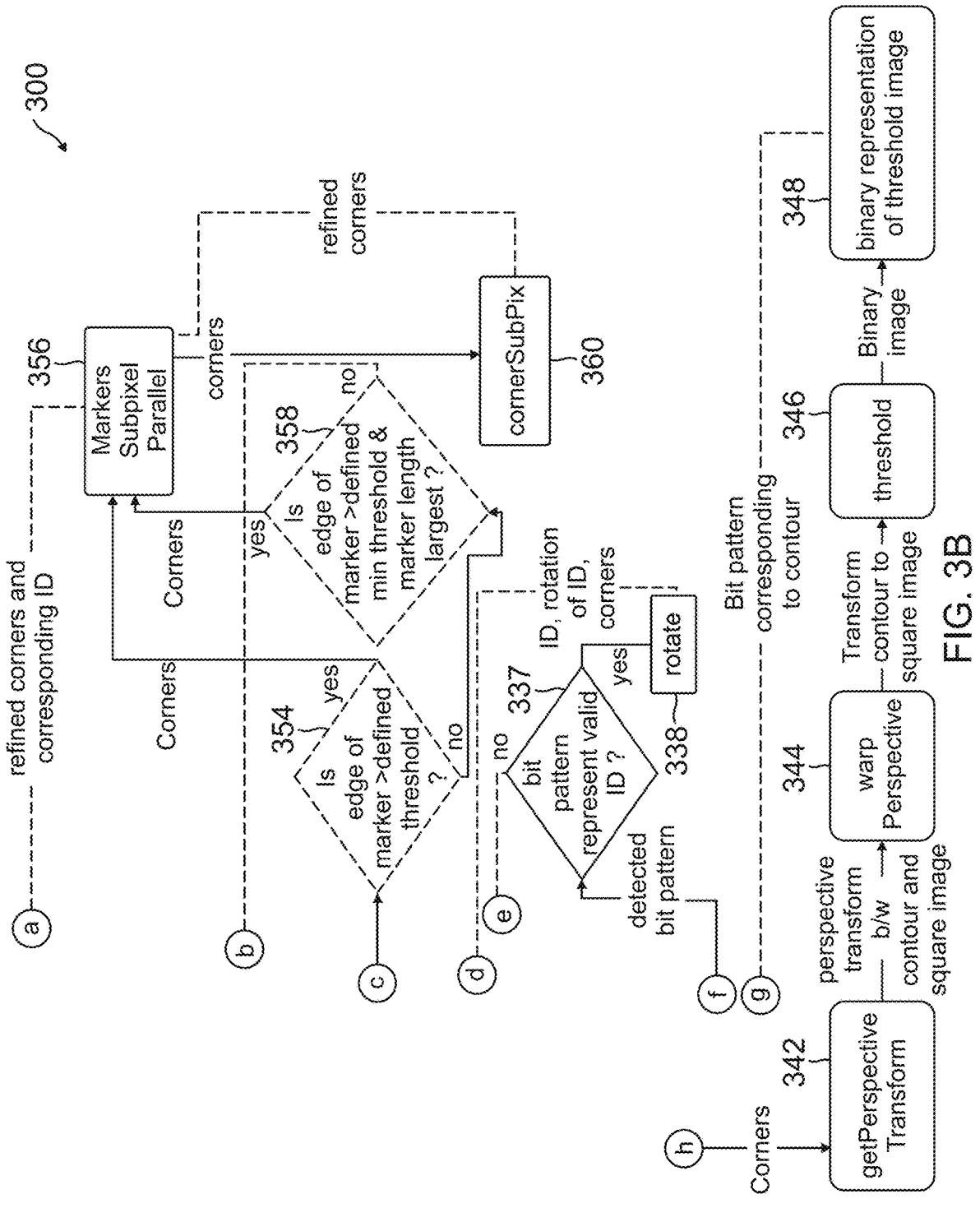

FIGS. 3A and 3B are flow diagrams of a method 300, showing details of hierarchical function calls for the present surface marker detection approach, according to an exemplary implementation. A main function 302 provides a color input image to a detect markers function 304, which is the top level function call for surface marker detection. The detect markers function 304 is called from inside main function 302, and calls other subfunctions to return detected corners, contours, and surface marker IDs to the main function 302.

A detect candidates function 306 is the first function called from detect markers function 304. The detect candidates function 306 returns contours and corresponding corners that satisfy user-selected criteria on the number of corners and contour length, which identifies possible candidates for surface markers. The detect candidates function 306 receives a gray scale image converted from the color input image, and calls a detect initial candidates function 308 with various user-selected parameters as an input.

In a first sub-process, the detect initial candidates function 308 checks the dimensions of the input candidates against a user-selected threshold, and when satisfied, calls a detect initial candidates parallel function 310. The detect initial candidates parallel function 310 uses an OpenCV parallel call (using parallel_for_(Range (0, nScales) from the free on-line repository OpenCV) to execute this function simultaneously at different user-selected window scales (e.g., 3, 5, 7, 9, 11, 13, 15, for a maximum window size of 15 (nScales)) to speed up the processing. The detect initial candidates parallel function 310 for each window size calls a threshold function 312 on the gray scale image with the selected window scale and an adaptive, user-selected threshold, which is nominally set to a default value (e.g., 7 is the free on-line repository OpenCV's default value). The threshold function 312 calls the OpenCV adaptiveThreshold function with the gray scale image, window size, and adaptive user-selected threshold constant. The threshold function 312 returns a binary thresholded image for the selected window size that satisfies the user-selected thresholds. These images will be referred to as thresholded images in the following.

The thresholded image using windows of different sizes from threshold function 312 acts as an input to a find marker contours function 314 for finding a valid contour and corners. The find marker contours function 314 takes the thresholded image and calculates the minimum and maximum contour length. The find marker contours function 314 then calls a find contours function 316 (from the free on-line repository OpenCV) for detecting the contours within the thresholded image. Once the contours are detected, each contour is checked against a user-selected threshold, and the contour lengths that are within this user-selected threshold are passed to the following functions for further processing.

All contours that satisfy the above user-select criteria are passed to an approxPolyDP function 318 (from the free on-line repository OpenCV), which takes the detected contours and a tunable, user-selected accuracy parameter. Based on the accuracy parameter, the approxPolyDP function 318 tries to fit a polygon with a user-selected number of sides to each contour. Since the present method is only interested in 4-sided polygons having four corners (as they can be a potential candidate for valid IDs within the Aruco code library), the method checks for the polygons that are approximated using four corners. After satisfying this user-selected criteria, the corners are checked against a user-selected minimum pixel separation between any two corners. If the contour satisfies this threshold test, then all four corners of the contour are checked against a user-selected minimum distance to the border pixels of the image. If the corners of the contour are within the minimum distance to the border pixel threshold and are close to the image border, then the detected contour corners will have more errors as compared to a detected contour that exceeds the minimum distance to the border threshold. If the contour satisfies all of the above user selected threshold tests through the find marker contours function 314 and the detect initial candidates parallel function 310, to the detect initial candidates function 308, then it is returned as a possible contour candidate (valid polygon). The window size for all contour candidates is also returned.

FIGS. 4A-4D illustrate various example images and outputs produced by an exemplary operation of the first sub-process under the detect candidates function 306. Note that all of the outputs shown here are for a single window.

Figures 4A, 4B, 4C, 4D:
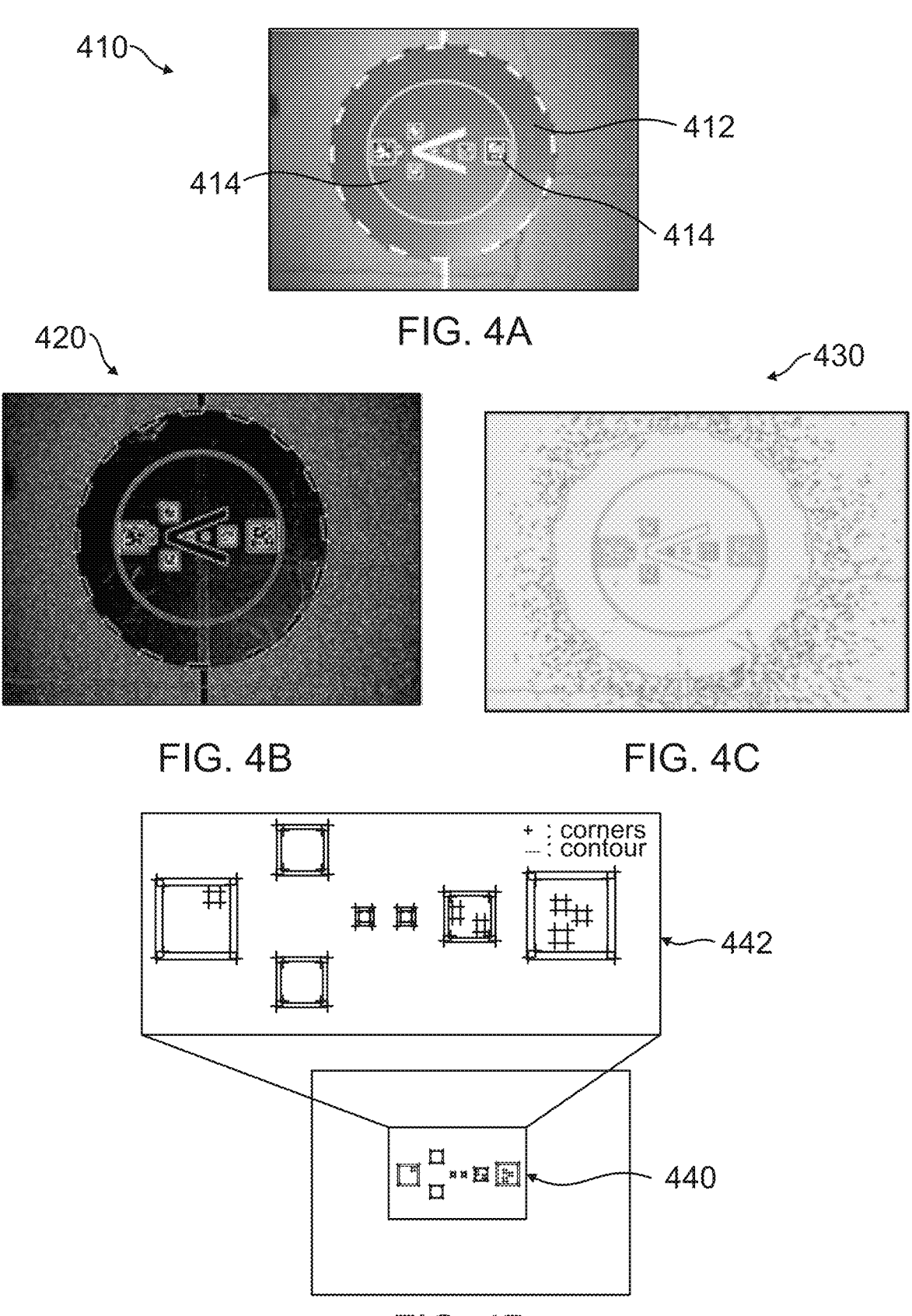
FIGS. 4A-4D depict example images and outputs produced by an exemplary process operation in the method for extracting surface markers of FIG. 3A.

FIG. 4A is an example of a gray scale image 410 converted from a color input image. The gray scale image 410 shows a vertical landing and takeoff site 412 with various Aruco codes 414, such as at a landing site at a vertiport for UAS. The gray scale image 410 is passed to the detect candidates function 306. As described above, the detect candidates function 306 calls the detect initial candidates function 308, which in turn calls the detect initial candidates parallel function 310, which provides the parallel implementation for contour detection at different window sizes. The detect initial candidates parallel function 310 simultaneously calls the threshold function 312 and the find marker contours function 314 at different window sizes to speed up execution. The threshold function 312 internally calls the OpenCV adaptiveThreshold, and converts the gray scale image using user-selected thresholds into a binary image based on a user-selected window size. The binary image thresholded for a user-selected window size is output to the find marker contours function 314. FIG. 4B is an example of a binary thresholded image 420 based on gray scale image 410 and which is output from the threshold function 312.

The find marker contours function 314 calls the find contours function 316 and the approxPolyDP function 318 to determine the valid contours. The find contours function 316 determines all the possible contours in a binary thresholded image. FIG. 4C depicts an example of an output image 430 with detected contours based on binary thresholded image 420 and which is output from the find contours function 316. Each of the detected contours is checked against a user-selected minimum perimeter pixel length and a user-selected maximum perimeter pixel length, and the contours which satisfy these user-selected thresholds are passed to the approxPolyDP function 318, which tries to fit a closed polygon (contours) to the identified points based on a user-selected approximation accuracy parameter passed thereto. Once an approximate polygon with corner points is returned by the approxPolyDP function 318, only those polygons that have four corners are considered. FIG. 4D is an example depiction of a set of detected polygons 440 with four corners, based on the output image 430 and which is output from the approxPolyDP function 318. An enlarged view of the detected polygons 440 is shown at 442 of FIG. 4D.

Returning to FIG. 3A, in a second sub-process, the detect initial candidates function 308 outputs the valid contours with four corners (candidates) to a reorder candidates corners function 320, which uses three corners (e.g., 0, 1, 2) to compute the cross product (e.g., between 1-0 and 0-2) to determine whether the order of the corners is a clockwise or counter-clockwise sequence. If the order is not clockwise, then the corners (e.g., 1 and 3) are swapped to reorder the corners. Thereafter, a filter too close candidates function 322 receives the candidate contours with corners in the clockwise direction. A nested loop is executed, including an outer loop used to iterate over the size of the corners (total number of polygons with four corners), and an inner loop that executes from the next available polygon with respect to the polygon selected in the outer loop until all available polygons have been assessed. The minimum contour length is found between the two polygons (one corresponding to the outer loop and one corresponding to the inner loop). The distance of each corner of one polygon to every other corner of the other polygon is found, and then the average distance is taken by dividing the distance by 4. If the contours are nearby, then this distance will be very small and expected to belong to the same contours.

This distance is then compared with a user-selected minimum distance threshold between the contours in the pixels, which is computed using the minMarkerDistanceRate as follows: (minimum contour length among the contours under consideration)*minMarkerDistanceRate (user-selected, tunable parameter, e.g., 0.05). If the contours are nearby (within the user-selected minimum distance threshold), then this distance will be larger than the average distance between as computed earlier. If this happens, then such contour pair and window levels of both the contours are stored for further processing to remove the repeated candidates. After finding all the sets of contours that are close by, filtering is done based on the window size at which the contour is detected. This function iterates over the nearby contours and checks the pair that were detected to be nearby. If both of the nearby contours are detected at different window levels, then the contour and corners detected at a smaller window size is retained. In case both contours are detected at the same window size, then the average of the corners corresponding to the pair of contours under consideration is retained. Each distinct contour and corners that are retained are returned to the detect candidates function 306.

FIG. 5 illustrates various example images and outputs produced by an exemplary operation of the second sub-process under the detect candidates function 306. An example of a counter-clockwise polygon 502 with counter-clockwise corners is depicted (based on the detected polygons 440, FIG. 4D), and is shown as a clockwise polygon 504 after corner reorder. In addition, an example of a polygon 506 with multiple contours for the same boundary, and a polygon 508 with a single contour for the same boundary is also shown (based on the detected polygons 440, FIG. 4D).

Returning to FIG. 3A, the detect candidates function 306 outputs the distinct contours and corners to an identify candidates function 326, which returns the valid marker IDs and corresponding corners and candidates. The identify candidates function 326 calls an OpenCV parallel function, the identify candidates parallel function 328. After the return from the identify candidates parallel function 328, the following items are retuned back to the calling function: the valid ID and corresponding contours; the rejected contours that do not correspond to valid contours; and the window size at which the contour is detected.

The identify candidates parallel function 328 in turn calls an identify one candidate function 330 in a parallel fashion. The identify one candidate function 330 in turn calls the following functions in order: an extract bits function 332, a get border errors function 334, an identify function 336, and a rotate function 338 (FIG. 3B).

The extract bits function 332 determines the marker size with borders (e.g., as markerSizeWithBorders=dictionary→markerSize+2*markerBorderBits); and determines the margin (e.g., pixels around the warped image that need to be ignored while decoding to account for inconsistency of pixel value around the border for better decoding using cellMarginRate), and cell size as cellMarginRate*cell size. The extract bits function 332 calls a get PerspectiveTransform function 342 (OpenCV) as shown in FIG. 3B, to compute the perspective transform between the contour image and the square image determined by the value perspectiveRemovePixelPerCell*markerSize WithBorders (e.g., 28 pixels×28 pixels). The transform calculated from the getPerspectiveTransform function 342 is used to warp the given contour image to a square image by calling a warpPerspective function 344 (OpenCV). For the given warped image, the mean and standard deviation for the inner region of the warped image is calculated (i.e. ignoring the perspectiveRemovePixelPerCell/2 pixels on both the sides of the warped images as border pixels). If the calculated standard deviation is greater than a user selected minimum threshold minOtsuStdDev and the mean is greater than a user selected threshold, e.g. 127 (i.e., there are more white pixels than black pixels within the contour, and the contour is not completely white pixels), then the warped image qualifies for further processing. The extract bits function 332 then calls a threshold function 346 (OpenCV), where the warped image is thresholded to get a binary image, which is output as a binary representation of a threshold image at 348. Then, the group of pixels (i.e., perspectiveRemovePixelPerCell in x and y) are taken and a bit value corresponding to this block is calculated based on a majority of black or white pixels (e.g., 4×4 pixels) assigning 0 when majority pixels are black and 1 otherwise.

FIGS. 6A-6C illustrate various example images and outputs produced by an exemplary operation under the extract bits function 332. FIG. 6A depicts a bit pattern 610 corresponding to a thresholded image (marker bits). FIG. 6B is a contour image 620 after the warp perspective (e.g., 28×28 pixel image) using bit pattern 610. FIG. 6C is a binary thresholded image 630 produced from contour image 620.

Next, the border error is checked against a user-selected maximum border threshold. This is calculated using (dictionary→markerSize*dictionary→markerSize* params→maxErroneousBitsInBorderRate) by the extract bits function 332 calling get border errors function 334, which counts the number of non-zero bits along the border and returns the total count as border error. A determination is then made whether the border error value is smaller than a calculated maximum border threshold at 335, by comparing the border error value with the maximum border threshold calculated above. If the border error value is below the maximum border threshold, then it is passed to the identify function 336, as these bits will contain the actual bit encoding corresponding to the marker. If the border error value is not below the threshold, then the method returns to the identify one candidate function 330 for further processing.

The identify function 336 is an OpenCV implementation for decoding the bits and comparing them with the bits of the decoded surface markers in the Aruco code library.

The identify function 336 checks the detected bit patterns with all the markers in the Aruco code library to find the match and returns the matching ID (marker ID) along with the rotation associated with the ID (e.g., rotation of top left corner of the ID in the given contour in clockwise sense). A determination is made whether a detected bit pattern represents a valid ID at 337 (FIG. 3B). If not, then the method returns to the identify one candidate function 330 for further processing. If the detected bit pattern does represent a valid ID, then it is passed to the rotate function 338.

The rotate function 338 rotates the corners using the given rotation value to make sure the first corner corresponds to the top left corner of the unrotated marker and the remaining corners are in the clockwise direction. The rotate function 338 returns the detected marker ID, corners, corresponding contours, and the window level at which the marker ID was detected, to identify one candidate function 330. The identify candidates parallel function 328 then returns the following information to the identify candidates function 326: the valid ID and corresponding contours; the rejected contours that do not correspond to valid contours; and the window size at which contour is detected.

A filter detected markers own function 350 (FIG. 3A) receives various data inputs from the identify candidates function 326. These data inputs include corners, IDs, contours, and window sizes at which a marker ID is detected. The objective of the filter detected markers own function 350 is to remove extracted contours whose IDs correspond to the same ID because certain contours were not removed during the filter too close candidates function 322. A nested loop is iterated over the number of contours (same as number of IDs or distinct corner set detected). If two contours have the same ID, then the contour that is detected with a lower window size (as the contour detected at smaller window level will be closer to actual edge of the marker) is retained and other one is rejected. If two contours with the same ID are detected at the same window size, then there are two methods to choose the most appropriate corners. The first method takes the average of the contour corners. The second method takes the corners corresponding to the largest contour size. The filter detected markers own function 350 returns the unique ID and corresponding contour and corner for a given ID.

For any ID that is detected, the following process occurs. A determination is made whether the detected ID is valid for a given layout at 352 (i.e., detected ID is one among the IDs defined for a given layout). In case the detected ID is not present in the layout even though it is valid id for a given dictionary, the detected ID is rejected and the ID, corners and contour corresponding to this ID are deleted, and no further processing is done for this ID. If the detected ID is a valid ID for a given layout and passes the above test, then the minimum edge length for a given contour is found and if the minimum edge length is above a defined threshold (at 354), it is accepted as valid candidate for further processing. The valid candidate (corners) are then sent to a marker subpixel parallel function 356.

If the minimum edge length is below a defined minimum threshold, then that ID, corners and contours are removed, and no further processing is done. In case the number of minimum edge pixels are in between these thresholds and the marker length is below a maximum length corresponding to any of the detected candidates (at 358), then the ID is rejected; otherwise, the ID is retained. If the IDs pass all of the above tests and are still valid, then the corners corresponding to the IDS are sent for refinement by calling the marker subpixel parallel function 356.

The marker subpixel parallel function 356 is a parallel implementation for corner refinement in order to provide better estimates of corners, and is called in parallel for all the detected corners set for each ID. The marker subpixel parallel function 356 in turn calls a corner subpix function 360 (OpenCV implementation) over different detected corners for different IDs. The corner subpix function 360 is operative to return more refined and accurate corners for a given ID to marker subpixel parallel function 356.

Figure 7:
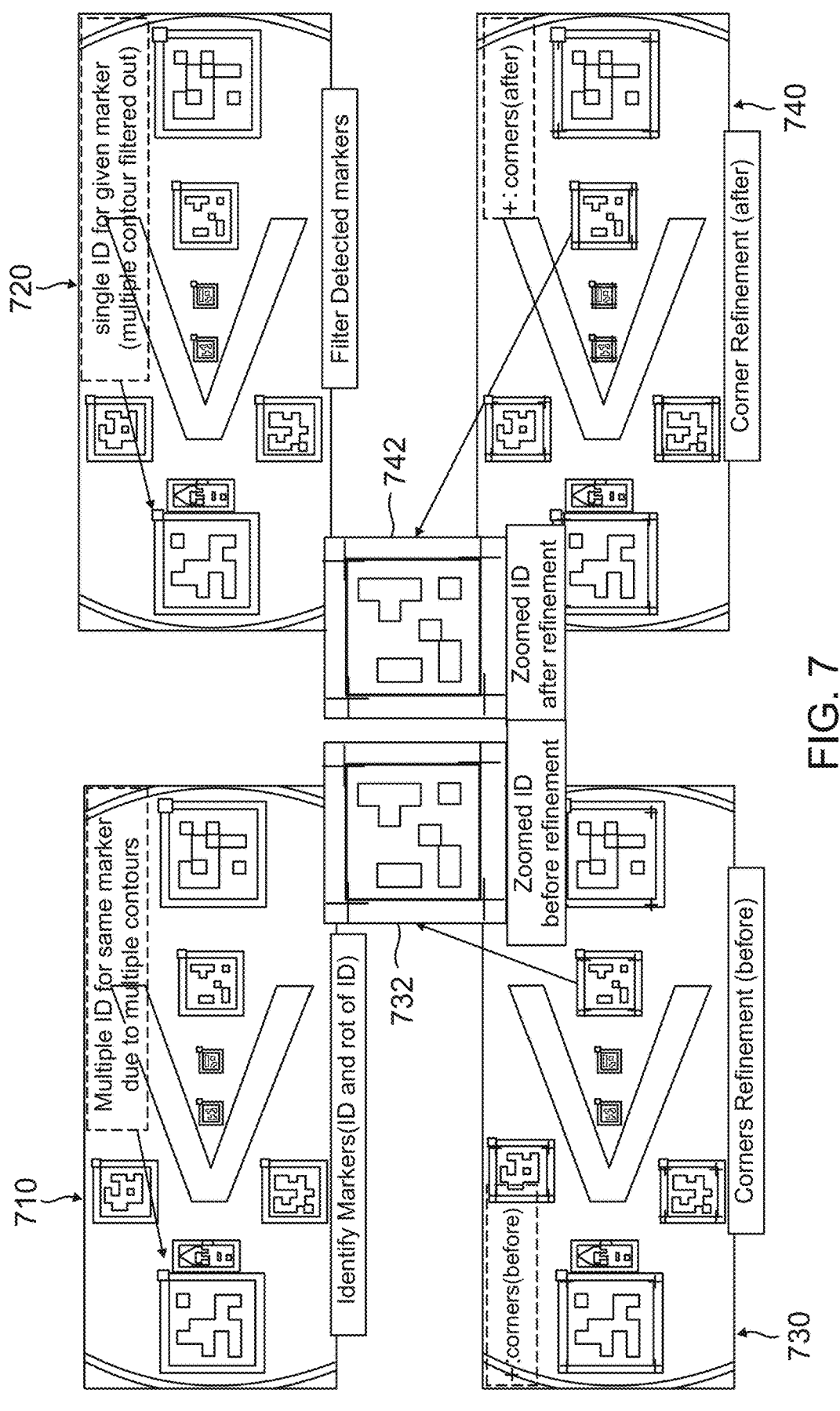
FIG. 7 depicts example images from various exemplary operations in the method for extracting surface markers of FIGS. 3A and 3B.

FIG. 7 illustrates various example images from an exemplary operation under the detect markers function 304. The images are enlarged views of the vertical landing and takeoff site 412 with various Aruco codes 414 (see FIG. 4A). A first example image 710 shows identified markers (ID and rotated ID). There are multiple IDs for the same marker due to multiple contours. A second example image 720 shows filtered detected markers, in which there is a single ID for a given marker (as multiple contours are filtered out). A third example image 730 shows identified markers before corner refinement, with an enlarged view of one of the markers shown at 732 (zoomed ID before refinement-blue shifted). A fourth example image 740 shows identifed markers after corner refinement, with an enlarged view of one of the markers shown at 742 (zoomed ID after refinement-green shifted). After corner refinement, the corners are better aligned with the edges of the marker as compared to before the corner refinement.

A computer or processor used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present systems and methods.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a method comprising: capturing, with a vision sensor on a vehicle, a color image of a landing site that includes one or more landing surface markers; converting the color image to a gray scale image; performing multi-scale-binarization to detect multiple edges of the gray scale image and produce a plurality of binary images having differing sizes, based on the gray scale image; wherein multiple windows of different sizes are used to detect edges in the gray scale image, and within a given window, an adaptive threshold is used to slide the window across the gray scale image to produce a complete edge map for the given window; determining contours of edges of the binary images that have closed shapes; detecting any closed shapes of the contours of edges that have four corners by a process comprising: selecting the contours of edges that exceed a user-selected threshold for perimeter size; retaining the selected contours that have four sides; determining a minimum corner separation of the contours that have four sides; eliminating any contours that are within a user-selected threshold for distance from an edge of a respective binary image; and retaining any remaining contours as four-sided candidate contours; verifying whether the four-sided candidate contours are valid as potential landing surface markers by a process comprising: warping each four-sided candidate contour into a fixed size square contour that is tested for sufficient variance of an image intensity value by computing a standard deviation of the image intensity value, and if the standard deviation of the image intensity value is above a user-selected threshold, then converting the fixed size square contour into a binary image to determine a candidate bit pattern within the contour; wherein if an encoded bit error corresponding to a border of each candidate bit pattern is below a user-selected threshold, then accepting the candidate bit pattern for further processing; and determining if bits of the candidate bit pattern, other than its border bits, match any standard bit patterns within a surface marker library for a given landing site at a vertiport, and if there is a match within a user-selected bit error threshold, then accepting the candidate bit pattern as a valid ID; wherein if more than one contour is associated with a valid ID within the surface marker library, then selecting the contour within a smallest window size and ignoring all other contours; wherein if multiple contours within a same window size can be associated with a valid ID within the surface marker library, then computing a mean of corresponding corners of the multiple contours; and performing corner refinement of valid four-sided candidate contours identified as potential landing surface markers by a process comprising: using local gradients to move corners of each four-sided candidate contour to a sharpest transition point.

Example 2 includes the method of Example 1, further comprising: determining if a detected ID within a contour is in a list of valid IDs within the surface marker library for the given landing site; if the detected ID is in the list of valid IDs, accepting the contour with the detected ID as valid for further processing; if the detected ID is not in the list of valid IDs, ignoring the contour with the detected ID and proceeding to a next contour with a detected ID; wherein if a valid detected ID has a contour size above a first user-selected threshold, then the contour with the valid detected ID is accepted for further processing; wherein if a valid detected ID has a contour size below a second user-selected threshold, then the contour with this valid detected ID is rejected; wherein for any contours with valid detected IDs with a contour size between the first and second user-selected thresholds, the contour with the valid detected ID having a largest size is accepted and all other valid IDs are rejected.

Example 3 includes the method of Example 2, wherein a combination of contours with valid detected IDs are used to determine a correct landing site at a vertiport with multiple landing sites to avoid landing site ambiguity, when one or more nearby landing sites have common markers.

Example 4 includes the method of any of Examples 1-3, wherein the vehicle comprises an unmanned aircraft systems (UAS) vehicle, an uncrewed aerial vehicle (UAV), or an urban air mobility (UAM) vehicle.

Example 5 includes the method of any of Examples 1-4, wherein the one or more landing surface markers comprise one or more Aruco codes.

Example 6 includes a system comprising: at least one vision sensor mounted on a vehicle; at least one processor operatively coupled to the at least one vision sensor; wherein the at least one processor includes program instructions, executable by the at least one processor, to perform a method comprising: capturing, with the at least one vision sensor, a color image of a landing site that includes one or more landing surface markers; converting the color image to a gray scale image; performing multi-scale-binarization to detect multiple edges of the gray scale image and produce a plurality of binary images having differing sizes, based on the gray scale image; wherein multiple windows of different sizes are used to detect edges in the gray scale image, and within a given window, an adaptive threshold is used to slide the window across the gray scale image to produce a complete edge map for the given window; determining contours of edges of the binary images that have closed shapes; detecting any closed shapes of the contours of edges that have four corners by a process comprising: selecting the contours of edges that exceed a user-selected threshold for perimeter size; retaining the selected contours that have four sides; determining a minimum corner separation of the contours that have four sides; eliminating any contours that are within a user-selected threshold for distance from an edge of a respective binary image; and retaining any remaining contours as four-sided candidate contours; verifying whether the four-sided candidate contours are valid as potential landing surface markers by a process comprising: warping each four-sided candidate contour into a fixed size square contour that is tested for sufficient variance of an image intensity value by computing a standard deviation of the image intensity value, and if the standard deviation of the image intensity value is above a user-selected threshold, then converting the fixed size square contour into a binary image to determine a candidate bit pattern within the contour; wherein if an encoded bit error corresponding to a border of each candidate bit pattern is below a user-selected threshold, then accepting the candidate bit pattern for further processing; and determining if bits of the candidate bit pattern, other than its border bits, match any standard bit patterns within a surface marker library for a given landing site at a vertiport, and if there is a match within a user-selected bit error threshold, then accepting the candidate bit pattern as a valid ID; wherein if more than one contour is associated with a valid ID within the surface marker library, then selecting the contour within a smallest window size and ignoring all other contours; wherein if multiple contours within a same window size can be associated with a valid ID within the surface marker library, then computing a mean of corresponding corners of the multiple contours; and performing corner refinement of valid four-sided candidate contours identified as potential landing surface markers by a process comprising: using local gradients to move corners of each four-sided candidate contour to a sharpest transition point.

Example 7 includes the system of Example 6, wherein the at least one processor includes further program instructions, executable by the at least one processor, to further perform a method comprising: determining if a detected ID within a contour is in a list of valid IDs within the surface marker library for the given landing site; if the detected ID is in the list of valid IDs, accepting the contour with the detected ID as valid for further processing; if the detected ID is not in the list of valid IDs, ignoring the contour with the detected ID and proceeding to a next contour with a detected ID; wherein if a valid detected ID has a contour size above a first user-selected threshold, then the contour with the valid detected ID is accepted for further processing; wherein if a valid detected ID has a contour size below a second user-selected threshold, then the contour with this valid detected ID is rejected; wherein for any contours with valid detected IDs with a contour size between the first and second user-selected thresholds, the contour with the valid detected ID having a largest size is accepted and all other valid IDs are rejected.

Example 8 includes the system of any of Examples 6-7, wherein the vehicle comprises an unmanned aircraft systems (UAS) vehicle, an uncrewed aerial vehicle (UAV), or an urban air mobility (UAM) vehicle.

Example 9 includes the system of any of Examples 6-8, wherein the one or more landing surface markers comprise one or more Aruco codes.

Example 10 includes a system comprising: at least one vision sensor mounted on a vehicle; at least one processor onboard the vehicle and operatively coupled to the at least one vision sensor; and a navigation system onboard the vehicle and operatively coupled to the at least one processor; wherein the at least one processor hosts a set of program modules operative for extracting landing site surface marker information for use in navigation of the vehicle, the program modules comprising: a detect markers function module, which is operative to receive an input image captured by the at least one vision sensor and convert the input image to a gray scale image; a detect marker candidates function module, called from the detect markers function module, and operative to receive the gray scale image from the detect markers function module, wherein the detect marker candidates function module is operative to determine contours and corresponding corners from the gray scale image that satisfy user-selected criteria on number of corners and contour length, to detect potential candidates for markers; an identify marker candidates function module operative to receive the contours and corners detected from the detect marker candidates function module, check their validity for a potential marker valid ID within a surface marker library, return those contours and corners that correspond to a valid ID, and return a corresponding ID number; a filter detected markers function module operative to filter out multiple detections for a same marker, and retain a marker that is detected at a smallest window size for a given ID; and a corner refinement function module operative to refine a detected corner by aligning the detected corner with an actual marker corner as closely as possible; wherein extracted landing site surface marker information is sent to the navigation system for further processing to provide guidance for use during takeoff or landing of the vehicle.

Example 11 includes the system of Example 10, wherein the detect marker candidates function module is further operative to perform multi-scale-binarization to detect multiple edges of the gray scale image and produce a plurality of different edges within the same gray scale image.

Example 12 includes the system of Example 11, wherein multiple windows of different sizes are used to detect edges in the gray scale image, and within a given window, an adaptive threshold is used as the window slides across the gray scale image to produce a complete edge map of the gray scale image using the window.

Example 13 includes the system of any of Examples 11-12, wherein the detect marker candidates function module is further operative to: determine contours of edges of binary images that have closed shapes; and detect any closed shapes of the contours of edges that have four corners by a process that comprises: selecting the contours of edges that exceed a user-selected threshold for perimeter size; retaining the selected contours that have four sides; determining a minimum corner separation of the contours that have four sides; eliminating any contours that are within a user-selected threshold for distance from an edge of a respective binary image; and retaining any remaining contours as four-sided candidate contours.

Example 14 includes the system of Example 13, wherein the identify marker candidates function module is further operative to verify whether the four-sided candidate contours are valid as potential landing surface markers by a process that comprises: warping each four-sided candidate contour into a fixed size square contour that is tested for sufficient variance of an image intensity value by computing a standard deviation of the image intensity value, and if the standard deviation of the image intensity value is above a user-selected threshold, then converting the fixed size square contour into a binary image to determine a candidate bit pattern within the contour; wherein if an encoded bit error corresponding to a border of each candidate bit pattern is below a user-selected threshold, then accepting the candidate bit pattern for further processing; and determining if bits of the candidate bit pattern, other than its border bits, match any standard bit patterns within a surface marker library for a given landing site at a vertiport, and if there is a match within a user-selected bit error threshold, then accepting the candidate bit pattern as a valid ID.

Example 15 includes the system of Example 14, wherein if more than one contour is associated with a valid ID within the surface marker library, the filter detected markers function module is further operative to select the contour within a smallest window size and ignore all other contours.

Example 16 includes the system of any of Examples 14-15, wherein if multiple contours within a same window size can be associated with a valid ID within the surface marker library, then the filter detected markers function module is further operative to compute a mean of corresponding corners of the multiple contours.

Example 17 includes the system of any of Examples 14-16, wherein the corner refinement function module is further operative to perform corner refinement of valid four-sided candidate contours identified as potential landing surface markers by using local gradients to move corners of each four-sided candidate contour to a sharpest transition point.

Example 18 includes the system of any of Examples 14-17, wherein the potential landing surface markers comprise one or more Aruco codes.

Example 19 includes the system of any of Examples 10-18, wherein the vehicle comprises an unmanned aircraft systems (UAS) vehicle, an uncrewed aerial vehicle (UAV), or an urban air mobility (UAM) vehicle.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A method comprising:
capturing, with a vision sensor on a vehicle, a color image of a landing site that includes one or more landing surface markers;
converting the color image to a gray scale image;
performing multi-scale-binarization to detect multiple edges of the gray scale image and produce a plurality of binary images having differing sizes, based on the gray scale image;
    wherein multiple windows of different sizes are used to detect edges in the gray scale image, and within a given window, an adaptive threshold is used to slide the window across the gray scale image to produce a complete edge map for the given window;
determining contours of edges of the binary images that have closed shapes;
detecting any closed shapes of the contours of edges that have four corners by a process comprising:
    selecting the contours of edges that exceed a user-selected threshold for perimeter size;
    retaining the selected contours that have four sides;
    determining a minimum corner separation of the contours that have four sides;
    eliminating any contours that are within a user-selected threshold for distance from an edge of a respective binary image; and
    retaining any remaining contours as four-sided candidate contours;
verifying whether the four-sided candidate contours are valid as potential landing surface markers by a process comprising:
    warping each four-sided candidate contour into a fixed size square contour that is tested for sufficient variance of an image intensity value by computing a standard deviation of the image intensity value, and if the standard deviation of the image intensity value is above a user-selected threshold, then converting the fixed size square contour into a binary image to determine a candidate bit pattern within the contour;
    wherein if an encoded bit error corresponding to a border of each candidate bit pattern is below a user-selected threshold, then accepting the candidate bit pattern for further processing; and
    determining if bits of the candidate bit pattern, other than its border bits, match any standard bit patterns within a surface marker library for a given landing site at a vertiport, and if there is a match within a user-selected bit error threshold, then accepting the candidate bit pattern as a valid ID;

wherein if more than one contour is associated with a valid ID within the surface marker library, then selecting the contour within a smallest window size and ignoring all other contours;

wherein if multiple contours within a same window size can be associated with a valid ID within the surface marker library, then computing a mean of corresponding corners of the multiple contours; and performing corner refinement of valid four-sided candidate contours identified as potential landing surface markers by a process comprising:

using local gradients to move corners of each four-sided candidate contour to a sharpest transition point.

2. The method of claim 1, further comprising:

determining if a detected ID within a contour is in a list of valid IDs within the surface marker library for the given landing site;

if the detected ID is in the list of valid IDs, accepting the contour with the detected ID as valid for further processing;

if the detected ID is not in the list of valid IDs, ignoring the contour with the detected ID and proceeding to a next contour with a detected ID;

wherein if a valid detected ID has a contour size above a first user-selected threshold, then the contour with the valid detected ID is accepted for further processing;

wherein if a valid detected ID has a contour size below a second user-selected threshold, then the contour with this valid detected ID is rejected;

wherein for any contours with valid detected IDs with a contour size between the first and second user-selected thresholds, the contour with the valid detected ID having a largest size is accepted and all other valid IDs are rejected.

3. The method of claim 2, wherein a combination of contours with valid detected IDs are used to determine a correct landing site at a vertiport with multiple landing sites to avoid landing site ambiguity, when one or more nearby landing sites have common markers.

4. The method of claim 1, wherein the vehicle comprises an unmanned aircraft systems (UAS) vehicle, an uncrewed aerial vehicle (UAV), or an urban air mobility (UAM) vehicle.

5. The method of claim 1, wherein the one or more landing surface markers comprise one or more Aruco codes.

6. A system comprising:

at least one vision sensor mounted on a vehicle;

at least one processor operatively coupled to the at least one vision sensor;

wherein the at least one processor includes program instructions, executable by the at least one processor, to perform a method comprising:

capturing, with the at least one vision sensor, a color image of a landing site that includes one or more landing surface markers;

converting the color image to a gray scale image;

performing multi-scale-binarization to detect multiple edges of the gray scale image and produce a plurality of binary images having differing sizes, based on the gray scale image;

wherein multiple windows of different sizes are used to detect edges in the gray scale image, and within a given window, an adaptive threshold is used to slide the window across the gray scale image to produce a complete edge map for the given window;

determining contours of edges of the binary images that have closed shapes;

detecting any closed shapes of the contours of edges that have four corners by a process comprising:

selecting the contours of edges that exceed a user-selected threshold for perimeter size;

retaining the selected contours that have four sides;

determining a minimum corner separation of the contours that have four sides;

eliminating any contours that are within a user-selected threshold for distance from an edge of a respective binary image; and retaining any remaining contours as four-sided candidate contours;

verifying whether the four-sided candidate contours are valid as potential landing surface markers by a process comprising:

warping each four-sided candidate contour into a fixed size square contour that is tested for sufficient variance of an image intensity value by computing a standard deviation of the image intensity value, and if the standard deviation of the image intensity value is above a user-selected threshold, then converting the fixed size square contour into a binary image to determine a candidate bit pattern within the contour;

wherein if an encoded bit error corresponding to a border of each candidate bit pattern is below a user-selected threshold, then accepting the candidate bit pattern for further processing; and determining if bits of the candidate bit pattern, other than its border bits, match any standard bit patterns within a surface marker library for a given landing site at a vertiport, and if there is a match within a user-selected bit error threshold, then accepting the candidate bit pattern as a valid ID;

wherein if more than one contour is associated with a valid ID within the surface marker library, then selecting the contour within a smallest window size and ignoring all other contours;

wherein if multiple contours within a same window size can be associated with a valid ID within the surface marker library, then computing a mean of corresponding corners of the multiple contours; and performing corner refinement of valid four-sided candidate contours identified as potential landing surface markers by a process comprising:

using local gradients to move corners of each four-sided candidate contour to a sharpest transition point.

7. The system of claim 6, wherein the at least one processor includes further program instructions, executable by the at least one processor, to further perform a method comprising:

determining if a detected ID within a contour is in a list of valid IDs within the surface marker library for the given landing site;

if the detected ID is in the list of valid IDs, accepting the contour with the detected ID as valid for further processing;

if the detected ID is not in the list of valid IDs, ignoring the contour with the detected ID and proceeding to a next contour with a detected ID;

wherein if a valid detected ID has a contour size above a first user-selected threshold, then the contour with the valid detected ID is accepted for further processing;

wherein if a valid detected ID has a contour size below a second user-selected threshold, then the contour with this valid detected ID is rejected;

wherein for any contours with valid detected IDs with a contour size between the first and second user-selected thresholds, the contour with the valid detected ID having a largest size is accepted and all other valid IDs are rejected.

8. The system of claim 6, wherein the vehicle comprises an unmanned aircraft systems (UAS) vehicle, an uncrewed aerial vehicle (UAV), or an urban air mobility (UAM) vehicle.

9. The system of claim 6, wherein the one or more landing surface markers comprise one or more Aruco codes.

10. A system comprising:

at least one vision sensor mounted on a vehicle;

at least one processor onboard the vehicle and operatively coupled to the at least one vision sensor; and a navigation system onboard the vehicle and operatively coupled to the at least one processor;

wherein the at least one processor hosts a set of program modules operative for extracting landing site surface marker information for use in navigation of the vehicle, the program modules comprising:

a detect markers function module, which is operative to receive an input image captured by the at least one vision sensor and convert the input image to a gray scale image;

a detect marker candidates function module, called from the detect markers function module, and operative to receive the gray scale image from the detect markers function module, wherein the detect marker candidates function module is operative to determine contours and corresponding corners from the gray scale image that satisfy user-selected criteria on number of corners and contour length, to detect potential candidates for markers;

an identify marker candidates function module operative to receive the contours and corners detected from the detect marker candidates function module, check their validity for a potential marker valid ID within a surface marker library, return those contours and corners that correspond to a valid ID, and return a corresponding ID number;

a filter detected markers function module operative to filter out multiple detections for a same marker, and retain a marker that is detected at a smallest window size for a given ID; and a corner refinement function module operative to refine a detected corner by aligning the detected corner with an actual marker corner as closely as possible;

wherein extracted landing site surface marker information is sent to the navigation system for further processing to provide guidance for use during takeoff or landing of the vehicle.

11. The system of claim 10, wherein the detect marker candidates function module is further operative to perform multi-scale-binarization to detect multiple edges of the gray scale image and produce a plurality of different edges within the same gray scale image.

12. The system of claim 11, wherein multiple windows of different sizes are used to detect edges in the gray scale image, and within a given window, an adaptive threshold is used as the window slides across the gray scale image to produce a complete edge map of the gray scale image using the window.

13. The system of claim 11, wherein the detect marker candidates function module is further operative to:

determine contours of edges of binary images that have closed shapes; and detect any closed shapes of the contours of edges that have four corners by a process that comprises:

selecting the contours of edges that exceed a user-selected threshold for perimeter size;

retaining the selected contours that have four sides;

determining a minimum corner separation of the contours that have four sides;

eliminating any contours that are within a user-selected threshold for distance from an edge of a respective binary image; and retaining any remaining contours as four-sided candidate contours.

14. The system of claim 13, wherein the identify marker candidates function module is further operative to verify whether the four-sided candidate contours are valid as potential landing surface markers by a process that comprises:

warping each four-sided candidate contour into a fixed size square contour that is tested for sufficient variance of an image intensity value by computing a standard deviation of the image intensity value, and if the standard deviation of the image intensity value is above a user-selected threshold, then converting the fixed size square contour into a binary image to determine a candidate bit pattern within the contour;

wherein if an encoded bit error corresponding to a border of each candidate bit pattern is below a user-selected threshold, then accepting the candidate bit pattern for further processing; and determining if bits of the candidate bit pattern, other than its border bits, match any standard bit patterns within a surface marker library for a given landing site at a vertiport, and if there is a match within a user-selected bit error threshold, then accepting the candidate bit pattern as a valid ID.

15. The system of claim 14, wherein if more than one contour is associated with a valid ID within the surface marker library, the filter detected markers function module is further operative to select the contour within a smallest window size and ignore all other contours.

16. The system of claim 14, wherein if multiple contours within a same window size can be associated with a valid ID within the surface marker library, then the filter detected markers function module is further operative to compute a mean of corresponding corners of the multiple contours.

17. The system of claim 14, wherein the corner refinement function module is further operative to perform corner refinement of valid four-sided candidate contours identified as potential landing surface markers by using local gradients to move corners of each four-sided candidate contour to a sharpest transition point.

18. The system of claim 14, wherein the potential landing surface markers comprise one or more Aruco codes.

19. The system of claim 10, wherein the vehicle comprises an unmanned aircraft systems (UAS) vehicle, an uncrewed aerial vehicle (UAV), or an urban air mobility (UAM) vehicle.

* * * * *